United States Patent
Williams et al.

(10) Patent No.: US 7,023,499 B2
(45) Date of Patent: Apr. 4, 2006

(54) TELEVISION RECEIVER WITH MOTION SENSOR

(76) Inventors: Cassandra S. Williams, 1289 Mount Pisgah Downs, Austell, GA (US) 30168; Jeffery Sigler, Rt. 1, Box 412A, Daleville, AL (US) 36322; Clay Sigler, Jr., Rt. 1, Box 412A, Daleville, AL (US) 36322

( * ) Notice: Subject to any disclaimer, the term of this patent is extended or adjusted under 35 U.S.C. 154(b) by 596 days.

(21) Appl. No.: 10/201,692

(22) Filed: Jul. 24, 2002

(65) Prior Publication Data

US 2003/0058372 A1  Mar. 27, 2003

Related U.S. Application Data

(60) Provisional application No. 60/323,712, filed on Sep. 21, 2001.

(51) Int. Cl.
*H04N 5/225* (2006.01)

(52) U.S. Cl. ........................................... 348/836

(58) Field of Classification Search ........ 348/836–839, 348/825–827; 345/629, 158, 204, 649, 205, 345/659

See application file for complete search history.

(56) References Cited

U.S. PATENT DOCUMENTS

| | | | |
|---|---|---|---|
| 4,203,636 A * | 5/1980 | Wells | 312/7.2 |
| 5,134,390 A * | 7/1992 | Kishimoto et al. | 345/659 |
| 5,189,517 A | 2/1993 | Ohara | |
| 5,250,888 A * | 10/1993 | Yu | 318/640 |
| 5,418,595 A * | 5/1995 | Iwasaki et al. | 396/95 |
| 5,794,127 A | 8/1998 | Lansang | |
| 5,805,201 A * | 9/1998 | Fujiwara | 348/818 |
| 6,191,773 B1 * | 2/2001 | Maruno et al. | 345/158 |
| 6,195,135 B1 * | 2/2001 | Wilk et al. | 348/801 |
| 6,384,875 B1 * | 5/2002 | Bertagna | 348/825 |
| 6,466,278 B1 * | 10/2002 | Harrison et al. | 348/836 |
| 6,476,879 B1 * | 11/2002 | Ho et al. | 348/837 |
| 6,501,515 B1 * | 12/2002 | Iwamura | 348/734 |
| 6,570,627 B1 * | 5/2003 | Chang | 348/794 |
| 6,630,914 B1 * | 10/2003 | Tamekuni et al. | 345/8 |
| 6,633,286 B1 * | 10/2003 | Do et al. | 345/205 |
| 2002/0080239 A1 * | 6/2002 | Ikeda et al. | 348/207 |

* cited by examiner

*Primary Examiner*—Paulos M. Natnael
(74) *Attorney, Agent, or Firm*—Richard C. Litman

(57) ABSTRACT

A flat screen television set which is equipped with electronic sensors which activate a servo-motor or the like to move the screen in response to the presence and movement of a viewer. The television screen is mounted for swivel movement and is capable of movement to the right, left, up and down to the full extent of pre-determined angles. When the viewer moves beyond a pre-determined angular limit, the screen will swivel to the opposite direction until the sensors again detect the presence of the viewer. If there are multiple viewers, the sensors will respond to the viewer in possession of a remote control device.

20 Claims, 6 Drawing Sheets

TELEVISION RECEIVER WITH MOTION SENSOR

CROSS-REFERENCE TO RELATED APPLICATION

This application claims the benefit of U.S. Provisional Patent Application Ser. No. 60/323,712, filed Sep. 21, 2001.

BACKGROUND OF THE INVENTION

1. Field of the Invention

The present invention relates to television sets. More specifically, the present invention is drawn to a flat-screen television set equipped with electronic sensors which allow the screen to move and orient itself in accordance with the presence and movement of the viewer.

2. Description of Related Art

The demands of today's hurry-up world do not often provide time for a person to sit in one spot for thirty minutes or more to watch a television program. Even when moving from place to place in a common area, the static position of the television screen makes viewing impracticable. A television screen which would automatically position itself in accordance with the position of the viewer would certainly be a welcome addition to the art.

U.S. Pat. No. 5,189,517 (Ohara) is drawn to a remote unit for use with a television receiver. The unit is provided with a speaker and/or earphones for private listening. The unit also has control buttons for channel selection and volume control. There is no provision for automatic movement of the television screen.

U.S. Pat. No. 5,418,595 (Iwasaki et al.) discloses a camera which automatically tracks a subject that moves within a subject field. The camera employs light measurement to track the subject. The patentees do not contemplate the movement of a television screen in response to a viewer's position.

U.S. Pat. No. 5,794,127 (Lansang) is drawn to a headphone for remotely operating an entertainment center. No provision is made to cause a television screen to move automatically.

U.S. Pat. No. 5,805,201 (Fujiwara) discloses an automatic control which prevents a television from playing if the person watching is within a certain distance of the television set. The automatic control is designed to protect the eyes of small children and does not control movement of the television screen.

U.S. Pat. No. 6,195,135 B1 (Wilk et al.) is drawn to a flat screen television monitor. There is no provision to have the monitor move in response to a sensed presence of a viewer.

None of the above inventions and patents, taken either singly or in combination, is seen to disclose a television monitor which automatically moves in response to the presence of a viewer as will be subsequently described and claimed in the instant invention.

SUMMARY OF THE INVENTION

The instant invention is a flat-screen television set equipped with electronic sensors which activate a servomotor or the like to move the screen in response to the presence and movement of a viewer. The television screen is mounted for swivel movement and is capable of movement to the right, left, up and down to the full extent of pre-determined angles. When the viewer moves beyond a pre-determined angular limit, the screen will swivel to the opposite direction until the sensors again detect the presence of the viewer. If there are multiple viewers, the sensors will respond to the viewer in possession of the remote control device. An additional feature allows the screen to constantly move from side-to-side in the manner of a rotating fan.

The television set is mounted on a stand which includes front and rear control panels. The control panels include mechanisms to operate conventional functions such as power, volume, channel selection, cable hook-up, etc. There is also a switch (on/off) to activate or de-activate screen movement. As contemplated, speakers are positioned on the perimeter of the screen.

A remote control device is provided which incorporates most of the control functions present on the control panels. The remote also includes a single speaker. The single speaker has no volume control and can only be activated or de-activated. Additional sensors are included on the remote which would allow a viewer to change channels simply by passing a finger over the sensors. A removable strap is provided so that a viewer may attach the remote to himself/herself if desired. Various color schemes are contemplated to enhance aesthetic appeal.

Accordingly, it is a principal object of the invention to provide a television set having electronic sensors which are responsive to a viewer's presence.

It is another object of the invention to provide a television set having a screen which will automatically move in response to a viewer's movement.

It is a further object of the invention to provide a television set having a screen which can swivel to the right, left, up and down to the full extent of pre-determined angles.

Still another object of the invention is to provide a television set which includes a remote control device having a single speaker and specialized sensors.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

DETAILED DESCRIPTION OF THE PREFERRED EMBODIMENT

Figure 1:
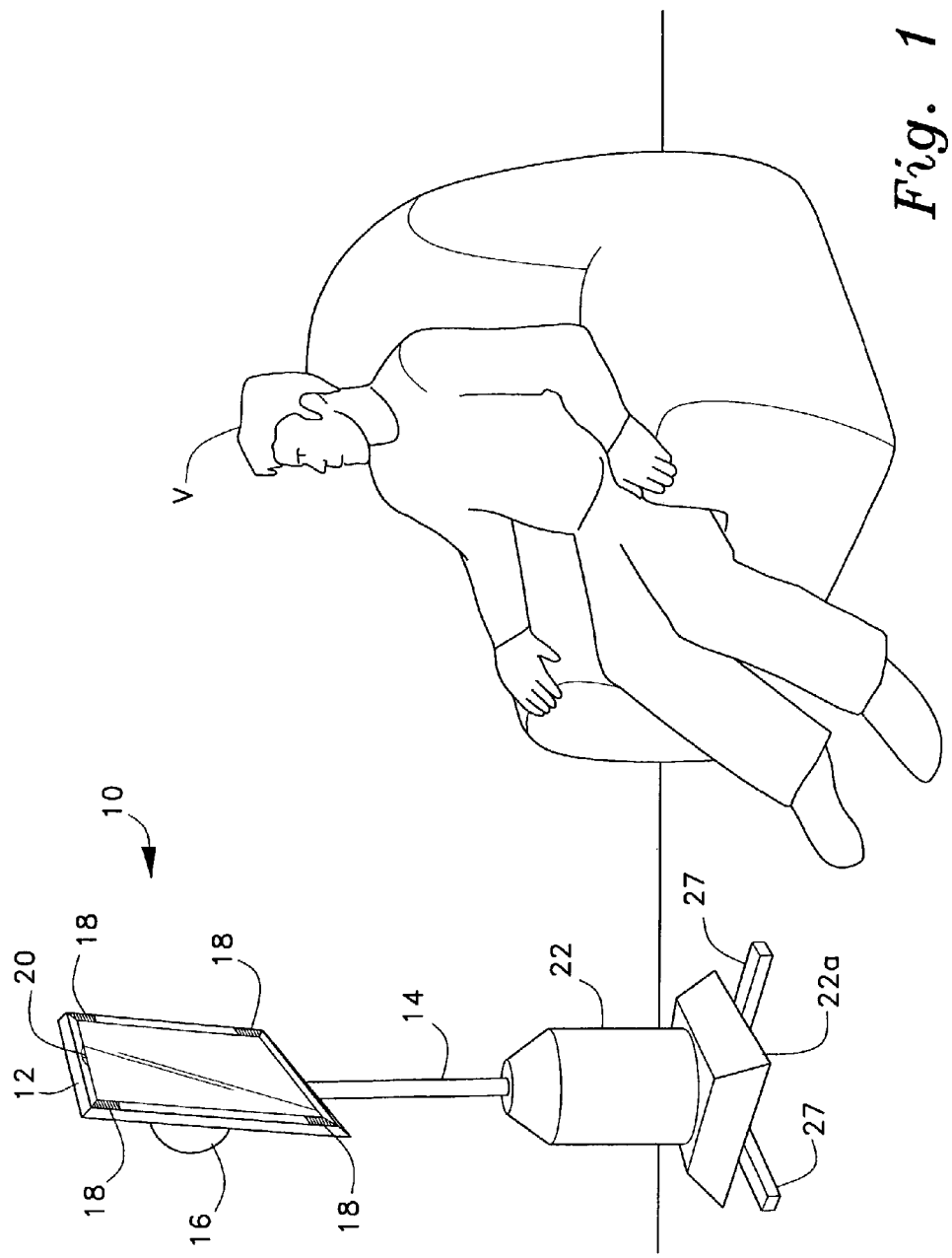
FIG. 1 is an environmental, perspective view of a motion vision television set according to the present invention.
Figure 2:
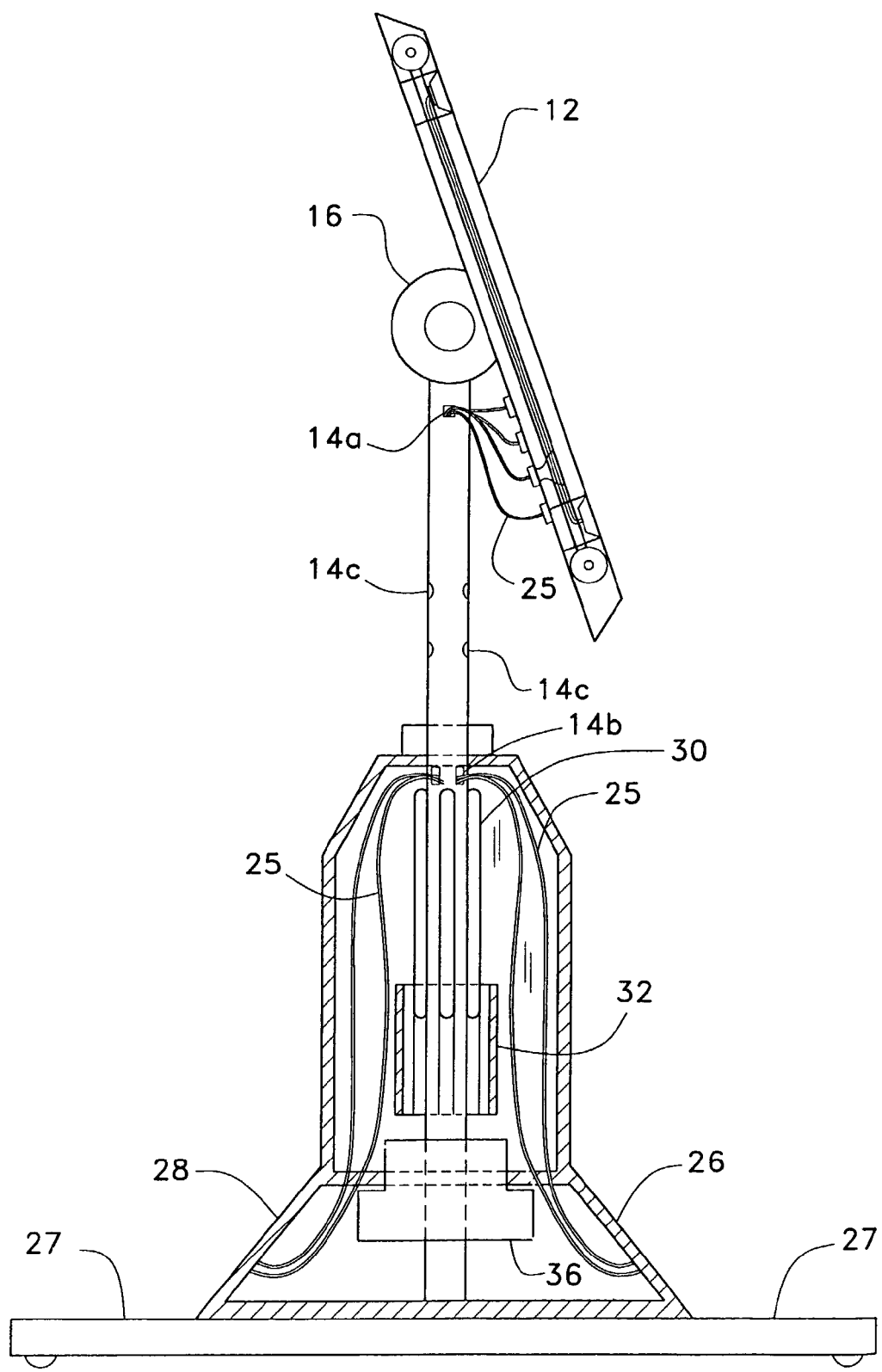
FIG. 2 is a sectional side view of a motion vision television set according to the present invention.

Attention is first directed to FIGS. 1 and 2 which illustrate the motion vision television set of the present invention generally at 10. The television set comprises a television screen or monitor 12 mounted for movement on hollow standard 14 and swivel head 16. Although shown as a flat-screen monitor, it is recognized that other monitor designs may be adapted to the invention. Multiple speakers 18 are provided on the periphery of the screen for optimum audio reproduction. An electronic motion sensor 20 is centrally positioned on the top edge of monitor 12. Standard 14 is mounted for vertical movement in body member 22, which body member is supported on base 22*a*. Plural legs 27 (only two shown) extend perpendicularly from base 22*a* to provide stable support for the television set.

As best seen in FIG. 2, plural electronic transmission wires 25 extend from the rear of monitor 12 into the interior of standard 14 via an opening 14*a*. Transmission wires 25 exit standard 14 at 14*b* and are routed to various stations on front and rear control panels 26, 28 as will be further explained below. Vertical spindles 30 are evenly spaced around standard 14. A sprocket 32 meshes with and encompasses spindles 30. The lower end of sprocket 32 is coupled to a servo-motor 36. Servo-motor 36 functions to turn the standard to the right or left and move swivel head 16 up and down thus causing monitor 12 to move to the right, left, up or down in with the standard and swivel head. As stated above, the extent of the right, left, up, or down angular movement is pre-set and incorporated in the servo-motor mechanisms as is conventional in the art. Movement of the viewer V (FIG. 1) as sensed by electronic sensor 20, actuates the servo-motor and determines the extent and direction of angular movement within the pre-set limits. Positioning holes 14*c* are spaced along standard 14 so that the standard may be raised or lowered as desired. A conventional locking mechanism (not shown) can be provided to secure the standard at a chosen height.

Figure 3:
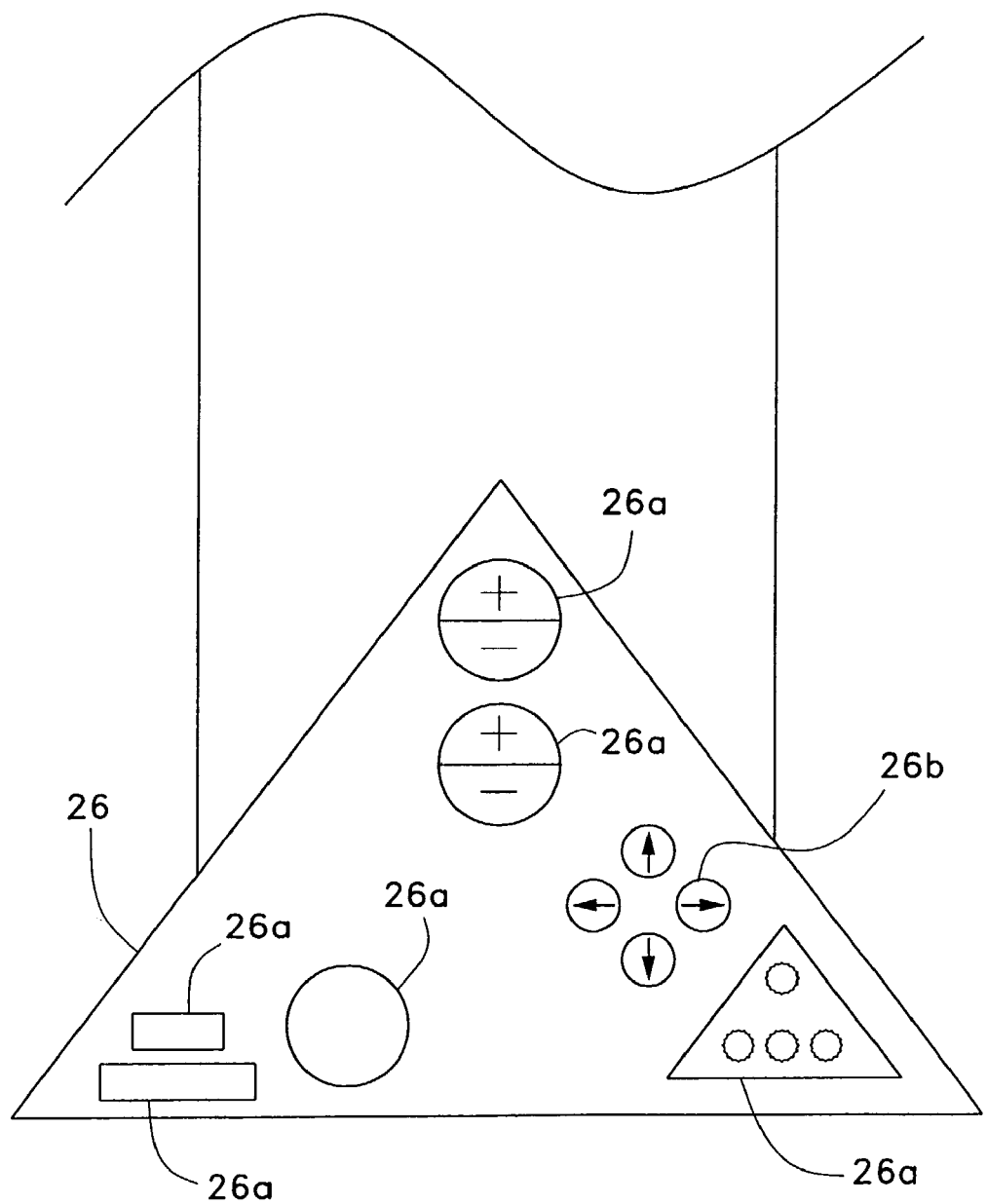
FIG. 3 is a partial front view of a front control panel of a motion vision television set according to the present invention.
Figure 4:
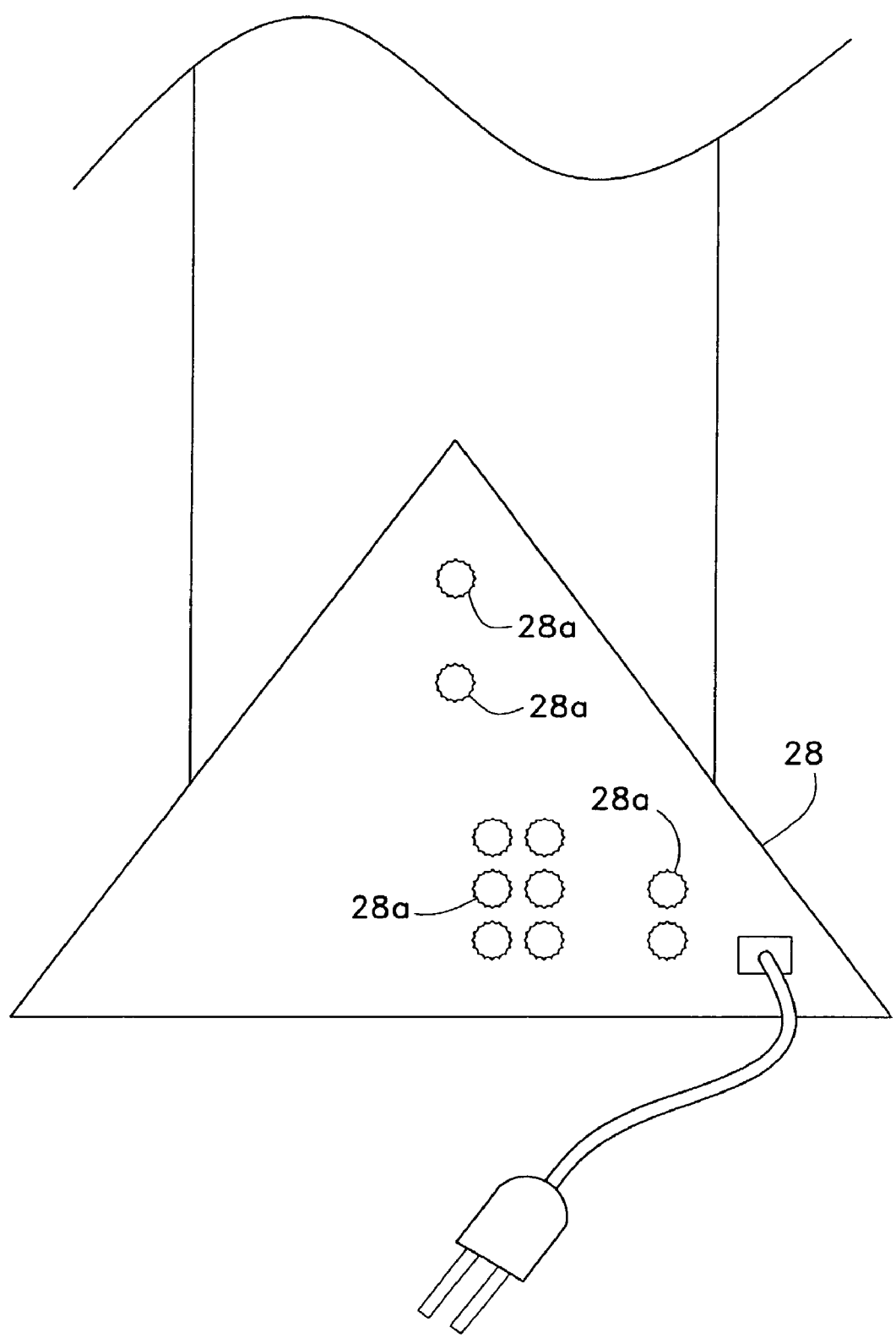
FIG. 4 is a partial rear view of a rear control panel of a motion vision television set according to the present invention.

FIG. 3 illustrates a plan view of the front control panel 26. Front control panel 26 includes all the conventional controls that are readily available on current television sets. Conventional controls for volume, channel selection, power, tv/video, etc. are indicated at 26*a*. In addition to the conventional controls, panel 26 includes a control 26*b* which functions to override sensor 20 so that monitor movement may be controlled from the panel if desired. Rear control panel 28, shown in FIG. 4, is provided with all of the usual hookups 28*a* such as vhf/uhf, video out, audio out etc. Electronic transmission wires 25 which extend from the monitor are connected to the various controls for the purposes as indicated.

Figure 5:
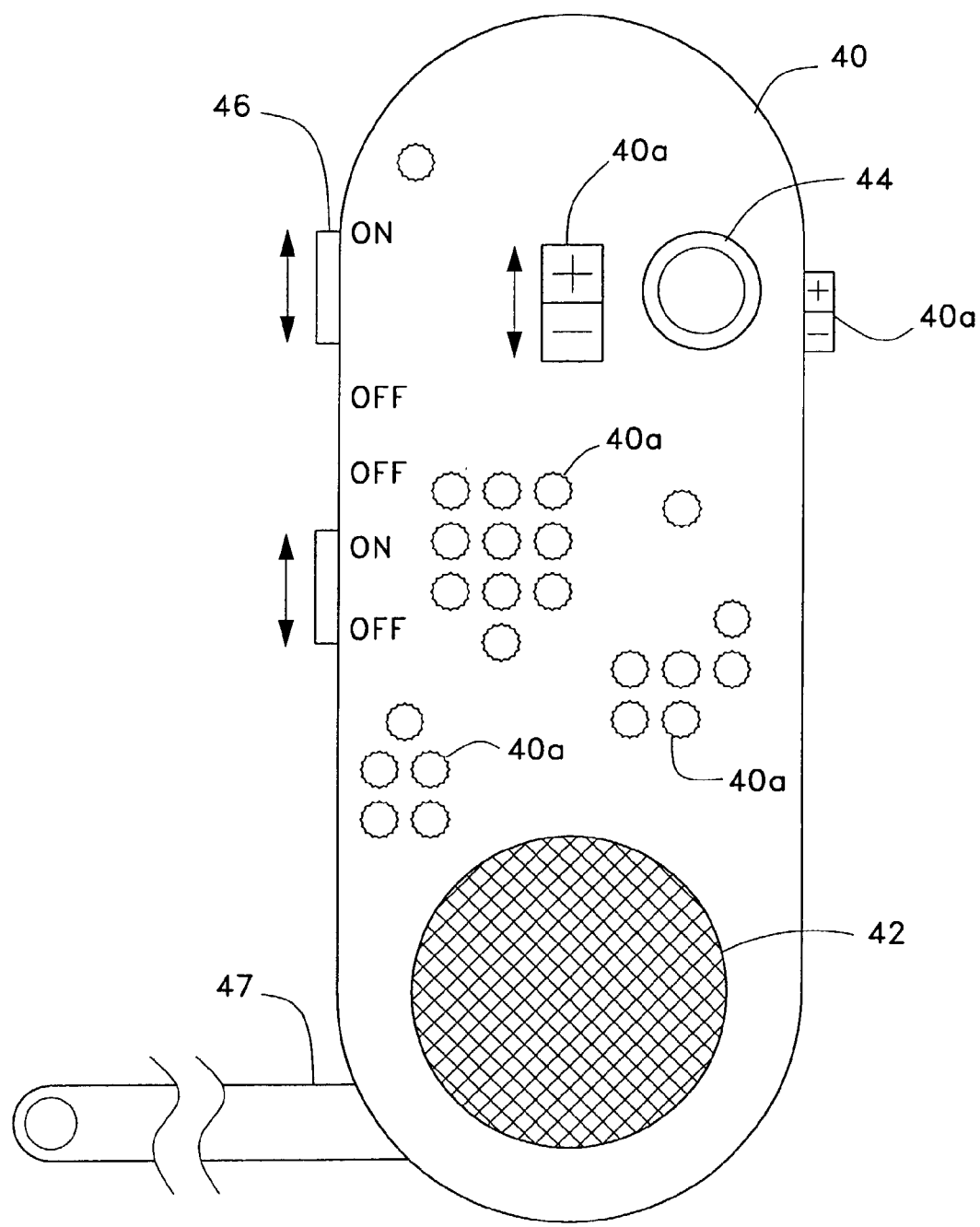
FIG. 5 is a front view of a remote control device of a motion vision television set according to the present invention.
Figure 6:
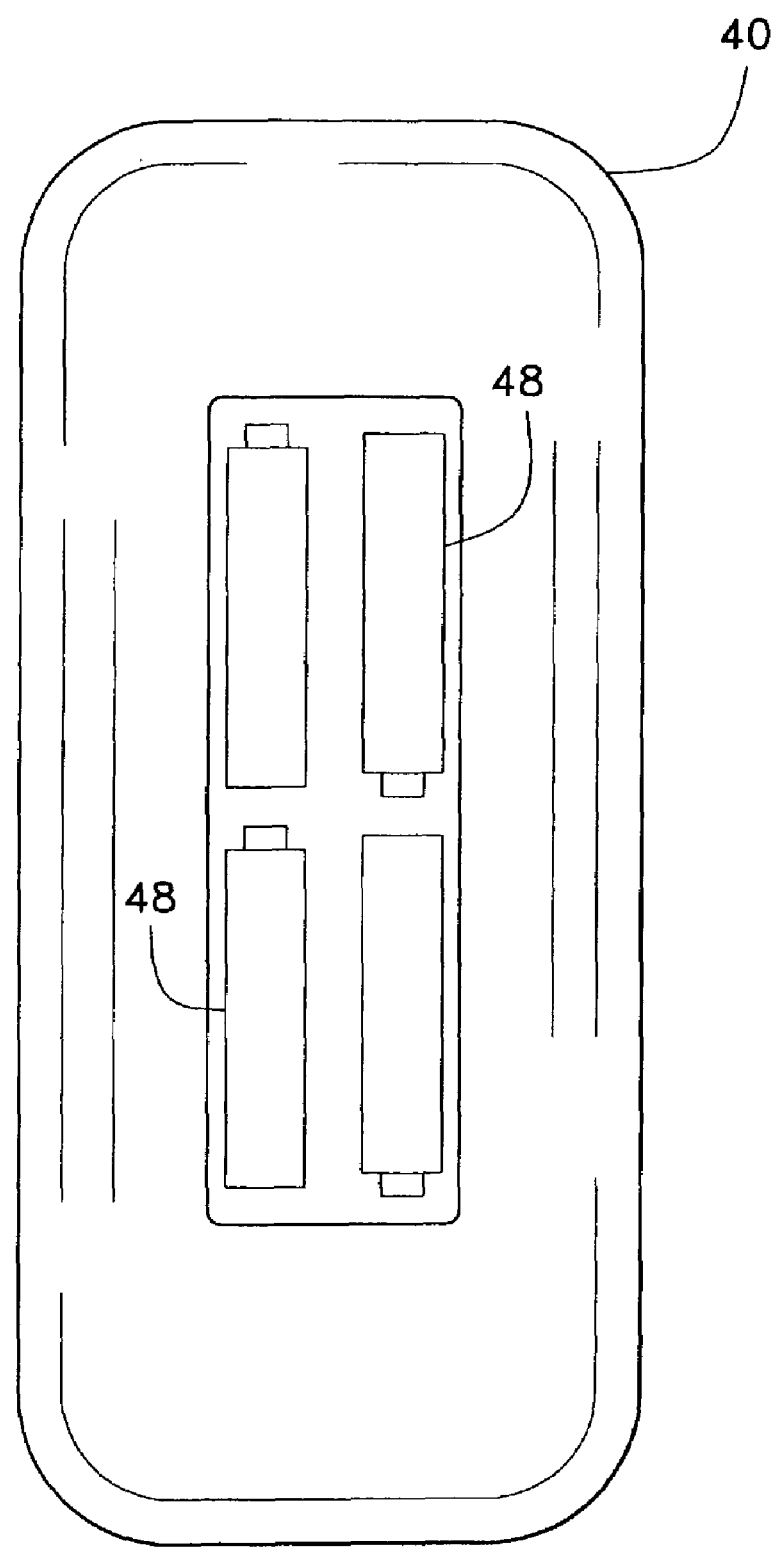
FIG. 6 is a partial rear view of a remote control device of a motion vision television set according to the present invention the with battery compartment cover removed.

FIGS. 5 and 6 are illustrative of a remote control device 40 to be used in conjunction with the television set of the instant invention. The front face of remote device 40 (FIG. 5) incorporates all the conventional control functions 40*a* usually included in remote control devices (power, channel selection, volume control, tv/vcr, etc.). In addition to the conventional control functions, remote 40 includes a speaker 42 which transmits audio signals from the television set. Speaker 42 has no volume control and can only be operated in an on/off mode. Also, an electronic sensor 44 is included which permits a viewer to change channels simply by passing a finger over sensor 44. A removable strap 47 is provided so that remote 40 can easily be attached to the viewer if desired. A switch 46 functions to override sensor 20 and prevent the monitor from moving. Batteries 48 are inserted at the rear of remote 40 as shown in FIG. 6.

It is to be understood that the present invention is not limited to the sole embodiment described above, but encompasses any and all embodiments within the scope of the following claims.

We claim:

1. A television set comprising:
   a base member, said base member having walls enclosing an interior volume;
   a tubular standard having a lower end mounted in the interior volume of said base member, said tubular standard having an upper end extending above said base member;
   a television monitor having a front face, said television monitor positioned on said upper end of said tubular standard;
   a motion sensor disposed on said front face of said monitor;
   a first mechanism;
   a servo-motor mounted in the interior volume of said base member and mechanically interconnected with said first mechanism, said servo-motor electronically connected with said motion sensor;
   said first mechanism and said servo-motor for causing said standard to rotate in said interior volume and for causing said television monitor to swivel up and down on said upper end in response to motion detected by said motion sensor.

2. A television set as defined in claim 1, wherein said tubular standard has an outer surface; and
   said first mechanism includes a plurality of vertical spindles, said plurality of vertical spindles disposed on said outer surface and spaced evenly there around.

3. A television set as defined in claim 2, wherein said first mechanism includes a sprocket, said sprocket arranged to encompass and mesh with said plurality of vertical spindles.

4. A television set as defined in claim 3, wherein said first mechanism includes a swivel head mounted to said upper end of said tubular standard, said monitor attached to said swivel head.

5. A television set as defined in claim 4, including an array of wires, said array of wires electronically connecting said motion sensor to said servo-motor, whereby said servo motor functions to rotate said standard and move said swivel head up and down in response to motion detected by said motion sensor.

6. A television set as defined in claim 5, including a control panel, said control panel disposed on said base member.

7. A television set as defined in claim 6, including a control member disposed on said panel and electronically connected to said motion sensor for overriding said motion sensor.

8. A television set as defined in claim 7, including a remote control device electronically coupled to said television set; and
   a speaker disposed on said remote control device, said speaker adapted to receive audio signals from said television set.

9. A television set comprising:
   a base member, said base member having walls enclosing an interior volume;
   a tubular standard having a lower end mounted in the interior volume of said base member, said tubular standard having an upper end extending above said base member;
   a television monitor having a front face, said television monitor positioned on said upper end of said standard;
   a first mechanism including a servo-motor for imparting vertical, rotational and swivel movement to said standard; and a motion sensor electronically connected to said first mechanism, said motion sensor disposed on said front face of said monitor.

10. A television set as defined in claim 9, wherein tubular standard has an outer surface; and said first mechanism includes a plurality of vertical spindles, said plurality of vertical spindles disposed on said outer surface and spaced evenly there around.

11. A television set as defined in claim 10, wherein said first mechanism includes a sprocket, said sprocket arranged to encompass and mesh with said plurality of vertical spindles.

12. A television set as defined in claim 11, wherein said first mechanism includes a swivel head mounted to said upper end of said tubular standard, said monitor attached to said swivel head.

13. A television set as defined in claim 12, wherein said servo-motor is mounted in the interior volume of said base member; said sprocket, standard and swivel head being mechanically connected to said servo-motor.

14. A television set as defined in claim 13, including an array of wires, said array of wires electronically connecting said motion sensor to said servo-motor.

15. A television set as defined in claim 14, including a control panel, said control panel disposed on said base member.

16. A television set as defined in claim 15, including a control member disposed on said panel, said control member electronically connected to said motion sensor for overriding said motion sensor.

17. A television set as defined in claim 16, including a remote control device electronically coupled to said television set; and a speaker disposed on said remote control device, said speaker adapted to receive audio signals from said television set.

18. A television set as defined in claim 17, wherein said remote control device includes an electronic sensor; whereby a viewer can change channels on said television set by passing a finger over said electronic sensor.

19. A television set as defined in claim 17, wherein said remote control includes a removable strap, said removable strap adapted to be easily attached to a person.

20. A television set as defined in claim 17, wherein said remote control includes a switch, said switch adapted to override said motion sensor and prevent said monitor from moving.

* * * * *